United States Patent
Ishiguro et al.

(10) Patent No.: US 9,864,547 B2
(45) Date of Patent: Jan. 9, 2018

(54) STORAGE DEVICE AND CONTROL METHOD

(71) Applicant: TOSHIBA MEMORY CORPORATION, Minato-ku (JP)

(72) Inventors: Takashi Ishiguro, Yokohama (JP); Hirokazu Morita, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 17 days.

(21) Appl. No.: 15/056,238

(22) Filed: Feb. 29, 2016

(65) Prior Publication Data

US 2017/0038970 A1  Feb. 9, 2017

(30) Foreign Application Priority Data

Aug. 6, 2015 (JP) .................. 2015-155918

(51) Int. Cl.
*G06F 3/06* (2006.01)
*G06F 1/32* (2006.01)

(52) U.S. Cl.
CPC .............. *G06F 3/0659* (2013.01); *G06F 1/32* (2013.01); *G06F 3/0625* (2013.01); *G06F 3/0634* (2013.01); *G06F 3/0679* (2013.01); *Y02B 60/1246* (2013.01)

(58) Field of Classification Search
CPC ........ G06F 1/32; G06F 3/0634; G06F 3/0659; G06F 3/061; G06F 3/0625; G06F 3/0679; G06F 3/0685; Y02B 60/1246
See application file for complete search history.

(56) References Cited

U.S. PATENT DOCUMENTS

| | | | |
|---|---|---|---|
| 2011/0296517 A1* | 12/2011 | Grigoriev | H04L 63/102 726/12 |
| 2012/0192032 A1* | 7/2012 | Iwasaki | G06F 11/1048 714/758 |
| 2012/0226887 A1 | 9/2012 | Culley et al. | |
| 2013/0246689 A1 | 9/2013 | Matsudaira et al. | |
| 2015/0106616 A1* | 4/2015 | Nix | H04W 52/0235 713/156 |
| 2015/0143032 A1 | 5/2015 | Hashimoto | |

FOREIGN PATENT DOCUMENTS

| | | |
|---|---|---|
| JP | 2013-196115 | 9/2013 |
| JP | 2014-26635 | 2/2014 |
| JP | 2014-507738 | 3/2014 |

* cited by examiner

*Primary Examiner* — Hashem Farrokh
(74) *Attorney, Agent, or Firm* — Oblon, McClelland, Maier & Neustadt, L.L.P.

(57) ABSTRACT

According to one embodiment, a storage device includes a processor which executes first processing, second processing and third processing. The second processing includes processing for relaying a command issued by a host device, and an execution result of the first processing corresponding to the. command, between the host device and the first processing. The third processing includes processing for causing the second processing to transition from a first state to a second state of lower energy consumption than the first state, when a first period in which the second processing is in an idle state exceeds a second period. The third processing further includes processing for maintaining the first state under a first condition, when the first period exceeds the second period.

17 Claims, 7 Drawing Sheets

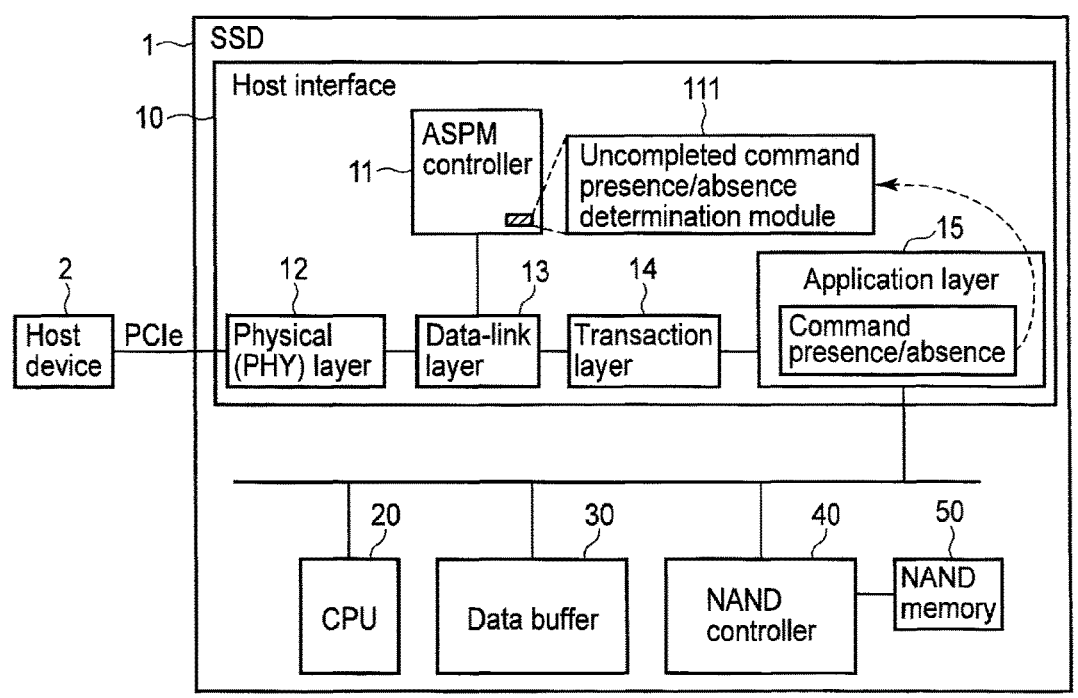
F I G. 1

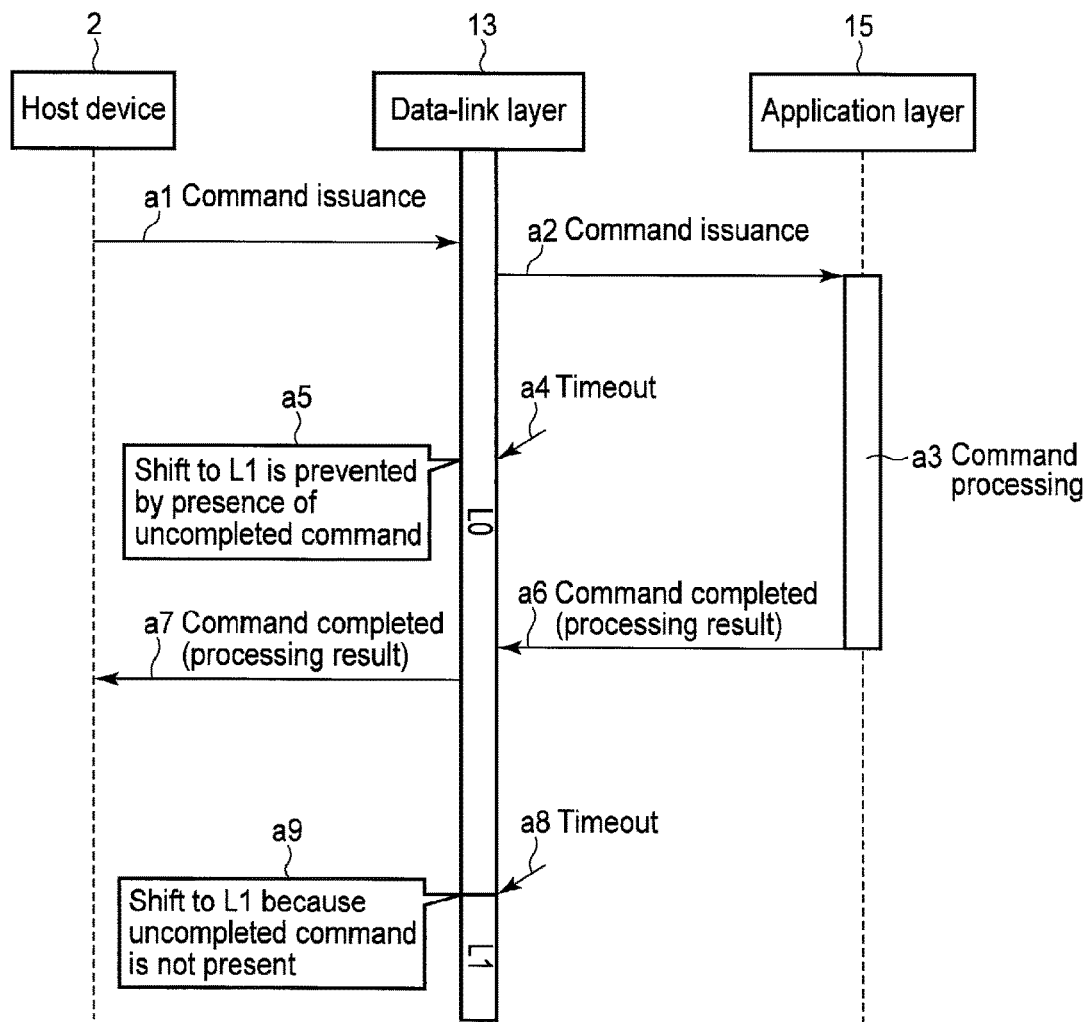
F I G. 2

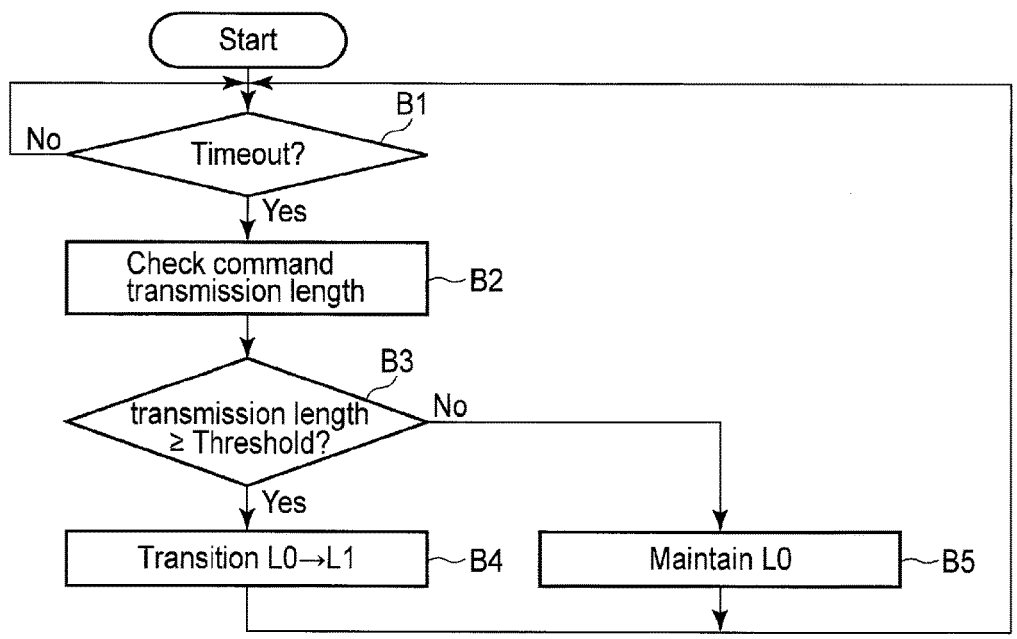
F I G. 6
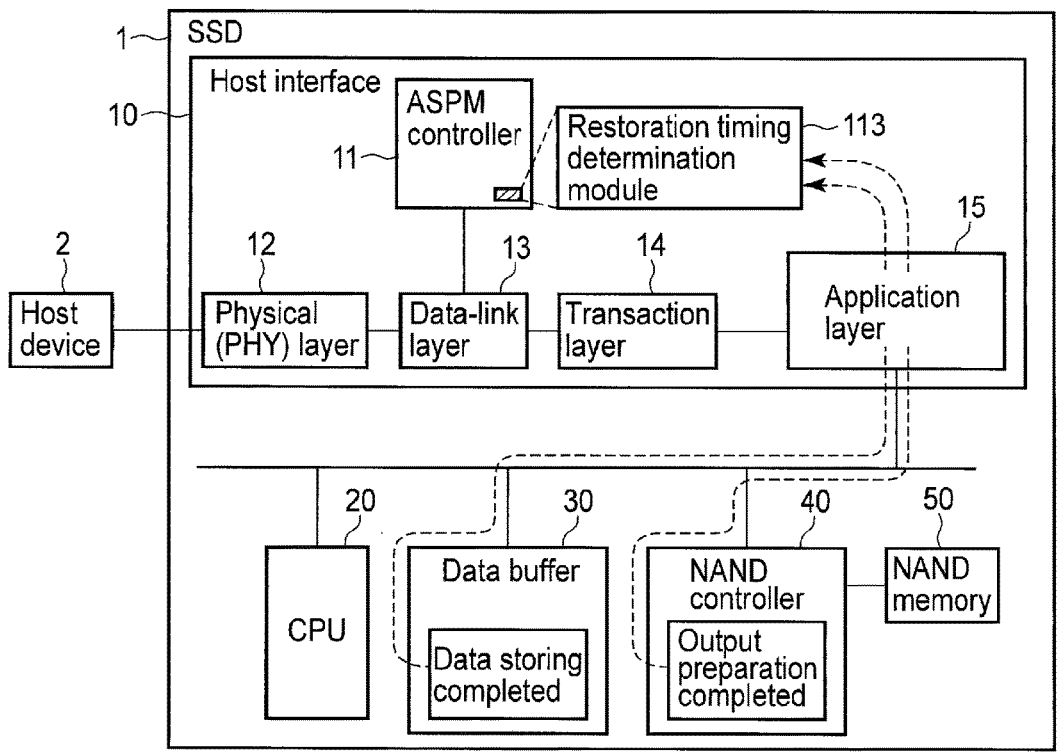
F I G. 7

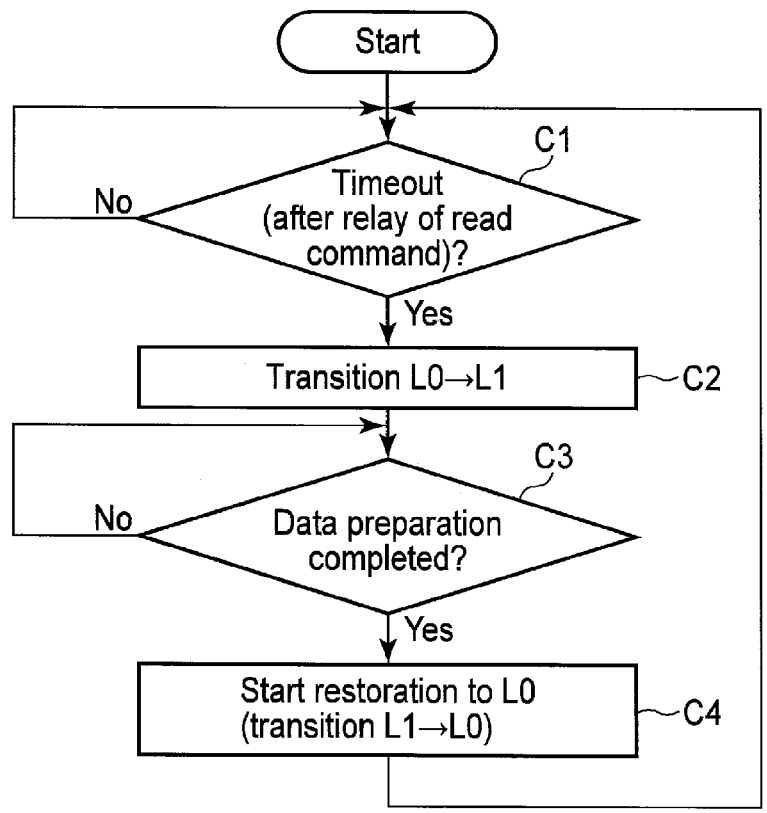
F I G. 9

STORAGE DEVICE AND CONTROL METHOD

CROSS-REFERENCE TO RELATED APPLICATIONS

This application is based upon and claims the benefit of priority from Japanese Patent Application No. 2015-155918, filed Aug. 6, 2015, the entire contents of which are incorporated herein by reference.

FIELD

Embodiments described herein relate generally to a storage device and control method.

BACKGROUND

In recent years, storage devices such as solid-state drives (SSDs) and the like, in which nonvolatile memories are incorporated, have become widespread. An SSD is a storage device to which a NAND memory (flash memory) is applied, and has an advantage of high performance/low energy consumption, and thus is now beginning to be utilized in various computers such as a personal computer (PC), server, and the like as a main storage in place of the hard disk drive (HDD).

An SSD is normally connected to a host device (computer) through a communication path conforming to the PCI Express (PCIe) interface standard.

BRIEF DESCRIPTION OF THE DRAWINGS

FIG. 1 is a block diagram showing a configuration example of a storage device according to a first embodiment.

FIG. 2 is a sequence chart for explaining the transition of the state of a communication path between the storage device of the first embodiment and host device.

FIG. 6 is a flowchart showing a procedure of control associated with the transition of the state of the communication path between the storage device and host device to be executed by the storage device of the second embodiment.

FIG. 7 is a block diagram showing a configuration example of a storage device according to a third embodiment.

FIG. 9 is a flowchart showing a procedure of control associated with the transition of the state of the communication path between the storage device and host device to be executed by the storage device of the third embodiment.

DETAILED DESCRIPTION

Figure 3:
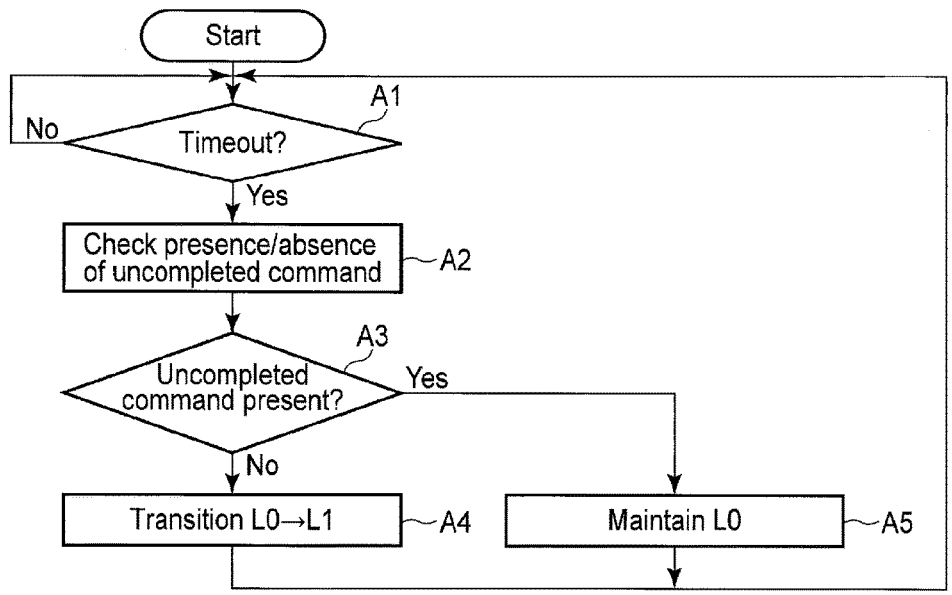
FIG. 3 is a flowchart showing a procedure of control associated with the transition of the state of the communication path between the storage device and host device to be executed by the storage device of the first embodiment.

In general, according to one embodiment, a storage device includes a nonvolatile first memory, a volatile second memory and a processor. The processor communicates with a host device connected to the storage device via a communication path. The processor executes a first processing, a second processing and a third processing. The first processing includes processing for access to the first memory through the intervention of the second memory. The second processing includes processing for relaying a command to request access to the first memory issued by the host device, and an execution result of the first processing corresponding to the command, between the host device and the first processing. The third processing includes processing for causing the second processing to transition from a first state to a second state of lower energy consumption than the first state, when a first period in which the second processing is in an idle state exceeds a second period. The third processing further includes processing for maintaining the first state of the second processing under a first condition, when the first period exceeds the second period.

First Embodiment

First, a first embodiment will be described below.

FIG. 1 is a block diagram showing a configuration example of a storage device according to this embodiment. Here, it is assumed that the storage device is realized as an SSD 1 to be utilized as, for example, a main storage of a host device 2. The host device 2 is a computer such as a PC, server or the like. The SSD 1 and the host device 2 are connected to each other via an interface conforming to the PCIe standard. In PCIe, a communication path control function capable of causing the state of the communication path called a link in PCIe to transition from a normal state ($L_0$) to a low-energy-consumption state ($L_1$) even when the device (computer, SSD) is in an operating state is provided. This communication path control function is called Active-State Power Management (ASPM). The SSD 1 is not limited to the one incorporated in the host device 2, and may be the one externally connected to the host device 2.

As shown in FIG. 1, the SSD 1 includes a host interface 10, a CPU 20, a data buffer 30, a NAND controller 40, and a NAND memory 50.

The host interface 10 is a module which executes communication between the SSD 1 and host device 2. The host interface 10 receives a command issued by the host device 2, and returns an execution result for the command to the host device 2. As shown in FIG. 1, the host interface 10 includes an ASPM controller 11, a physical (PHY) layer 12, a data-link layer 13, a transaction layer 14, and an application layer 15. Details of operations of components in the host interface 10 including an operation principle of the ASPM controller 11 peculiar to the SSD 1 of this embodiment will be described later.

The CPU 20 is a core part of the SSD 1, and is a module which controls operations of the host interface 10, the data buffer 30, and the NAND controller 40.

The data buffer 30 is, for example, a dynamic random access memory (DRAM), and is a storage device in which user data (data transmitted from the host device 2) to be written to the NAND memory 50, user data read from the NAND memory 50, system data used to manage a correspondence relationship between the logical block address (LBA) space recognized by the host device 2 and physical storage position on the NAND memory 50, and the like are temporarily stored. The data buffer 30 may be a memory other than a DRAM, and may be, for example, a static random access memory (SRAM), a magnetoresistive random access memory (MRAM), a ferroelectric random access memory (FeRAM) or the like.

The NAND controller 40 is a module which executes write of data to the NAND memory 50 and read of data from the NAND memory 50 while using the data buffer 30 (as a cache memory).

Further, the NAND memory 50 is a storage device in which aforementioned user data items, system data, and the like are permanently stored.

Here, operation of the host interface 10 when a command has been issued by the host device 2 will be described below.

The command issued by the host device 2 is, first of all, received by the physical layer 12 of the lowest layer, and is then transmitted to the application layer 15 of the highest layer by way of the data-link layer 13, and the transaction layer 14 which are the intermediate layers. The application layer 15 executes processing conforming to, for example, Non-Volatile Memory Express (registered trade mark) (NVMe) standard, and corresponding to this command. For example, when a read command is issued by the host device 2, the application layer 15 carries out processing of read of data from the NAND memory 50 through the NAND controller 40. The application layer 15 utilizes the data buffer 30 as a buffer of the read data. Further, when a write command is issued by the host device 2, the application layer 15 carries out processing of write of data to the NAND memory 50 through the NAND controller 40. The application layer 15 utilizes the data buffer 30 as a buffer of data to be written. On the other hand, a result of the processing executed by the application layer 15 of the highest layer is transmitted to the physical layer 12 of the lowest layer by way of the transaction layer 14, and the data-link layer 13 which are the intermediate layers, and is then returned to the host device 2.

Further, the ASPM controller 11 is a module which realizes the communication path control function provided by the PCIe. When a period in which the data-link layer 13 is in an idle state exceeds a predetermined period, the ASPM controller 11 instructs the data-link layer 13 to shift from a normal state ($L_0$) to a low-energy-consumption state ($L_1$). The idle state in the data-link layer 13 implies a state where neither a relay of a command from the lower layer to the higher layer nor a relay of a processing result (of processing corresponding to the command) from the higher layer to the lower layer is carried out. Thereby, it is possible to reduce the energy consumption of the SSD 1.

The aforementioned predetermined period can be set at any time and arbitrarily by the control from, for example, the host device 2. As the predetermined period, a period at least longer than the time required for the data-link layer 13 to be restored from the low-energy-consumption state ($L_1$) to the normal state ($L_0$), and corresponding to, for example, the time from the time when a command is issued from the host device 2 in a state where the data-link layer 13 is in the low-energy-consumption state ($L_1$) to the time when the NAND controller 40 starts an operation thereof concomitantly with execution of processing corresponding to the command carried out by the application layer 15, or the like can be set.

Incidentally, as described previously, the data-link layer 13 of the intermediate layer carries out relay of a command from the lower layer to the higher layer, and relay of a processing result (of processing corresponding to the command) from the higher layer to the lower layer. Accordingly, as in the case where the data-link layer 13 is in the idle state for a period exceeding the predetermined period, a case where, after a relay of a command to the higher layer (transaction layer 14) is completed, the time for processing corresponding to the command carried out by the application layer 15 exceeds the predetermined period is also conceivable. That is, the data-link layer 13 can transition from the normal state ($L_0$) to the low-energy-consumption state ($L_1$) before the data-link layer 13 relays the processing result (of the processing corresponding to the command) to the lower layer (physical layer 12).

In this case, on the occasion when the data-link layer 13 relays the processing result (of the processing corresponding to the command) to the lower layer (physical layer 12), it becomes necessary for the data-link layer 13 to be restored from the low-energy-consumption state ($L_1$) to the normal state ($L_0$). The time spent on the restoration of the data-link layer 13 from the low-energy-consumption state ($L_1$) to the normal state ($L_0$) at such timing appears as overhead, and adversely affects the performance of the SSD 1. The SSD 1 of this embodiment is a device including a contrivance (uncompleted command presence/absence determination module 111) which improves the control associated with the transition of the state of the data-link layer 13, and this point will be described below in detail.

In order to avoid such an aforementioned event as to adversely affect the performance of the SSD 1, the ASPM controller 11 includes an uncompleted command presence/absence determination module 111. The uncompleted command presence/absence determination module 111 is a module which determines whether or not a command being processed by the application layer 15 is present. It should be noted that here, although a description will be given assuming that the uncompleted command presence/absence determination module 111 is provided in the ASPM controller 11, the uncompleted command presence/absence determination module 111 may be provided in, for example, a host interface 10 separately from the ASPM controller 11 in such a manner that the uncompleted command presence/absence determination module 111 controls the ASPM controller 11 from outside.

An outline of the control associated with the transition of the state of the data-link layer 13 to be executed by the ASPM controller 11 provided with the uncompleted command presence/absence determination module 111 will be described below with reference to FIG. 2. FIG. 2 is a sequence chart for explaining the transition of the state of the data-link layer 13 in the SSD 1 of this embodiment. It should be noted that in FIG. 2, notations of the physical layer 12 and the transaction layer 14 are omitted.

When a command is issued by the host device 2 (a1 in FIG. 2), the command is relayed to the application layer 15 through the data-link layer 13 (a2 in FIG. 2). Then, the application layer 15 executes processing corresponding to the command (a3 in FIG. 2).

Here, a case (timeout occurrence) where the time elapsed from the time when the data-link layer 13 which has completed the relay of a command has been brought into the idle state exceeds a predetermined period while the application layer 15 is executing processing is assumed (a4 in FIG. 2). When a timeout occurs, the ASPM controller 11 (uncompleted command presence/absence determination module 111) determines whether or not a command being processed by the application layer 15 is present. As the determination method, for example, various methods such as referring to a queue in which a command is stored, and the like can be employed.

When a command being processed by the application layer 15 is present, the ASPM controller 11 maintains the data-link layer 13 in the normal state ($L_0$). In other words, the ASPM controller 11 prevents the data-link layer 13 from being shifted to the low-energy-consumption state ($L_1$) (a5 in FIG. 2). Thereby, when thereafter a processing result is output from the application layer 15 which has completed the processing (a6 in FIG. 2), the processing result is relayed to the host device 2 through the data-link layer 13 maintained in the normal state ($L_0$) (a7 in FIG. 2). It is not necessary to restore the data-link layer 13 from the low-energy-consumption state ($L_1$) to the normal state ($L_0$), and hence it is possible to realize speed-enhancement with respect to the relay carried out by the data-link layer 13 as compared with the conventional case where the data-link layer 13 is restored from the low-energy-consumption state ($L_1$) to the normal state ($L_0$).

Next, a case (timeout occurrence) where the time elapsed from the time when the data-link layer 13 which has completed the relay of a processing result has been brought into the idle state exceeds a predetermined period is assumed (a8 in FIG. 2). As described previously, when a timeout occurs, the ASPM controller 11 (uncompleted command presence/absence determination module 111) determines whether or not a command being processed by the application layer 15 is present. Then, when a command being processed by the application layer 15 is not present, the ASPM controller 11 shifts the data-link layer 13 to the low-energy-consumption state ($L_1$) (a9 in FIG. 2). Thereby, the energy consumption of the SSD 1 can be reduced.

FIG. 3 is a flowchart showing a procedure of control associated with the transition of the state of the data-link layer 13 to be executed by the SSD 1 of this embodiment.

Having detected that the period in which the data-link layer 13 is in the idle state exceeds the predetermined period (YES in block A1), the SSD 1 checks whether or not an uncompleted command being processed by the application layer 15 is present (block A2). When an uncompleted command is not present (NO in block A3), the SSD 1 causes the data-link layer 13 to transition from the normal state ($L_0$) to the low-energy-consumption state ($L_1$) (block A4).

On the other hand, when an uncompleted command is present (YES in block A3), the SSD 1 does not cause the data-link layer 13 to transition from the normal state ($L_0$) to the low-energy-consumption state ($L_1$), and maintains the data-link layer 13 in the normal state ($L_0$) (block A5).

As described above, the SSD 1 of this embodiment achieves an improvement in the control associated with the transition of the state of the data-link layer 13.

Incidentally, in the above description, an example of a case where when the period in which the data-link layer is in the idle state exceeds the predetermined period, if an uncompleted command being processed by the application layer 15 is present, the data-link layer 13 is prevented from being caused to transition from the normal state ($L_0$) to the low-energy-consumption state ($L_1$) has been exemplified. Regarding ASPM, further lower-energy-consumption states ($L_2$ and $L_3$) are defined, and hence the state to which the transition is made may be selected according to whether or not an uncompleted command is present. More specifically, states $L_2$ and $L_3$ relate to lower energy consumption than that of state $L_1$ on the one hand, but require a longer time for the restoration to state $L_0$ than state $L_1$ on the other hand. In consideration of this point, when an uncompleted command is not present, the data-link layer 13 may be caused to transition to state $L_2$ or $L_3$ and, when an uncompleted command is present, the data-link layer 13 may be caused to transition to state $L_1$.

Second Embodiment

Next, a second embodiment will be described below.

Figure 4:
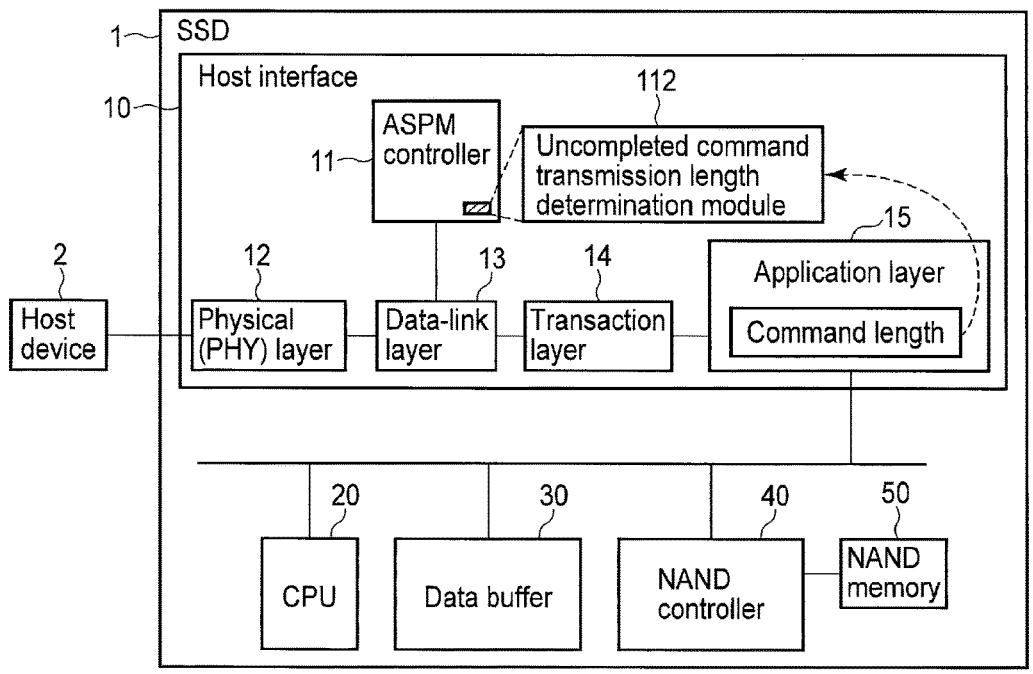
FIG. 4 is a block diagram showing a configuration example of a storage device according to a second embodiment.

FIG. 4 is a block diagram showing a configuration example of a storage device according to this embodiment. As in the aforementioned first embodiment, here, it is also assumed that the storage device is realized as an SSD 1 utilized as, for example, a main storage of the host device 2. Thus, regarding components, and the like identical to the aforementioned first embodiment, identical reference symbols are used, and descriptions of them are omitted.

As shown in FIG. 4, in an SSD 1 of this embodiment, an ASPM controller 11 of a host interface 10 includes an uncompleted command transmission length determination module 112 (in place of the uncompleted command presence/absence determination module 111 of the first embodiment). The uncompleted command transmission length determination module 112 is a module which determines the length of a command being processed by an application layer 15. Here, the command length implies a total transmission length (including, for example, write data, and the like) at the time of a relay of a command carried out by a data-link layer 13. It should be noted that, as in the aforementioned first embodiment, the uncompleted command transmission length determination module 112 may be provided not in the ASPM controller 11, but in, for example, a host interface 10 separately from the ASPM controller 11.

Figure 5:
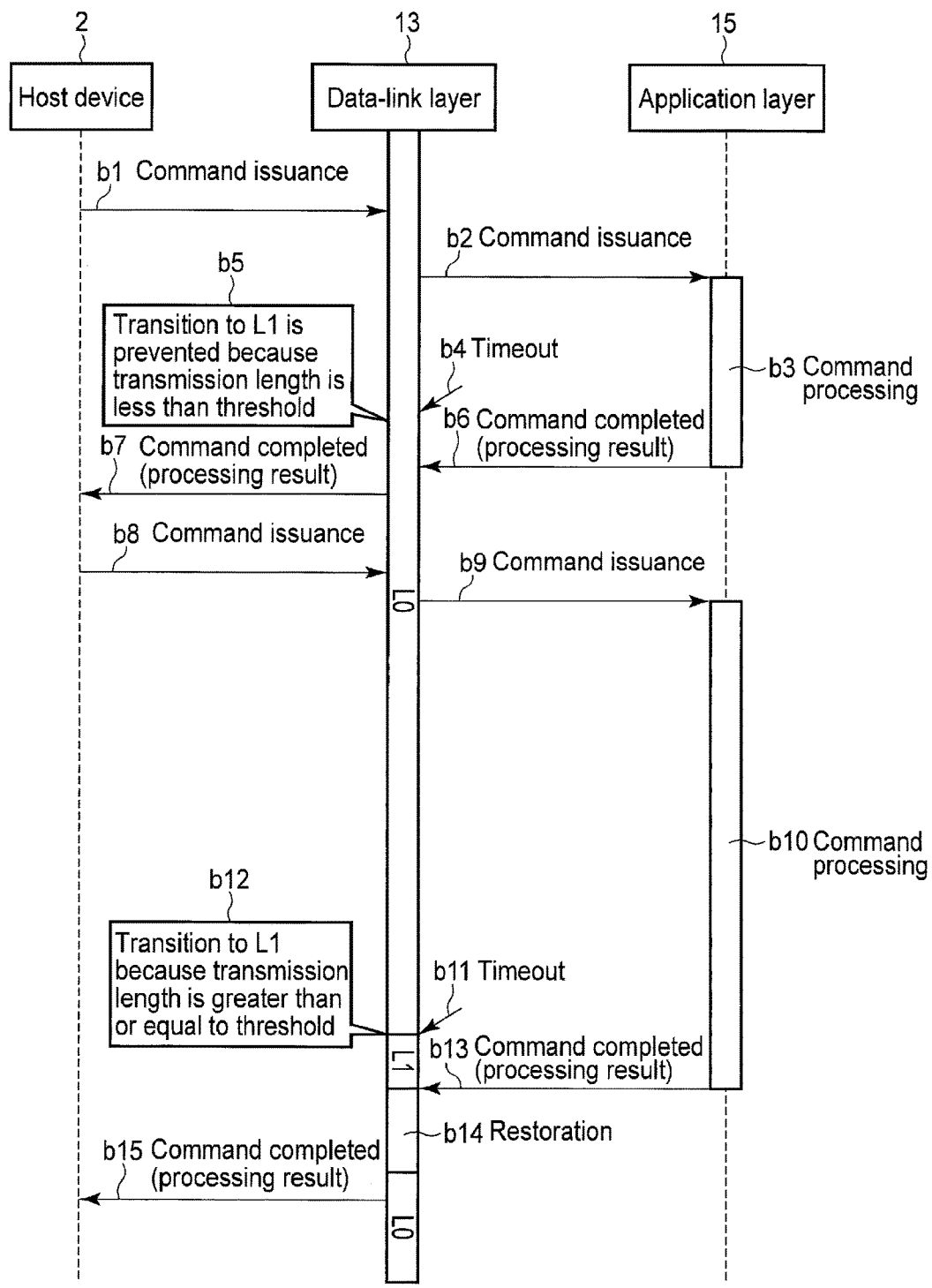
FIG. 5 is a sequence chart for explaining the transition of the state of a communication path between the storage device of the second embodiment and host device.

An outline of the control associated with the transition of the state of the data-link layer 13 to be executed by the ASPM controller 11 provided with the uncompleted command transmission length determination module 112 will be described below with reference to FIG. 5. FIG. 5 is a sequence chart for explaining the transition of the state of the data-link layer 13 in the SSD 1 of this embodiment. It should be noted that, as in the aforementioned first embodiment, in FIG. 5 too, notations of the physical layer 12 and the transaction layer 14 are omitted.

When a command is issued by the host device 2 (b1 in FIG. 5), the command is relayed to the application layer 15 through the data-link layer 13 (b2 in FIG. 5). At this time, the ASPM controller 11 (uncompleted command transmission length determination module 112) acquires a length of the command to be transmitted by the data-link layer 13. Then, the application layer 15 executes the processing corresponding to the command (b3 in FIG. 5).

Here, a case (timeout occurrence) where the time elapsed from the time when the data-link layer 13 which has completed the relay of the command has been brought into the idle state exceeds a predetermined period while the application layer 15 is executing processing is assumed (b4 in FIG. 5). When a timeout occurs, the ASPM controller 11 (uncompleted command transmission length determination module 112) determines whether or not the transmission length of a command being processed by the application layer 15 is greater than or equal to a threshold. Here, first, a case where the transmission length of the command is less than the threshold is assumed. The threshold of the transmission length of the command can also be set at any time and arbitrarily by the control from, for example, the host device 2.

When the transmission length of the command is short, it is presumed that the ratio of the time spent on the restoration of the data-link layer 13 from the low-energy-consumption state ($L_1$) to the normal state ($L_0$) to the time spent on the command processing (b3 in FIG. 5) is large. That is, it is considered that the influence of the former time on the performance is great. Thus, in such a case, priority is given to the performance, and the ASPM controller 11 maintains the data-link layer 13 in the normal state ($L_0$). In other words, the data-link layer 13 is prevented from being caused to transition to the low-energy-consumption state ($L_1$) (b5 in FIG. 5). Thereby, when thereafter a processing result is output from the application layer 15 which has completed the processing (b6 in FIG. 5), the processing result is relayed to the host device 2 through the data-link layer 13 maintained in the normal state ($L_0$) (b7 in FIG. 5). As in the aforementioned case, it is not necessary to restore the data-link layer 13 from the low-energy consumption-state ($L_1$) to the normal state ($L_0$), and hence it is possible to realize speed-enhancement with respect to the relay carried out by the data-link layer 13 as compared with the conventional case where the data-link layer 13 is restored from the low-energy-consumption state ($L_1$) to the normal state ($L_0$).

Here, again, a case (timeout occurrence) where a command is issued by the host device 2 (b8 in FIG. 5), the command is relayed to the application layer 15 through the data-link layer 13 (b9 in FIG. 5) and, while the application layer 15 is executing the processing (b10 in FIG. 5), the time elapsed from the time when the data-link layer 13 which has completed the relay of a command has been brought into the idle state exceeds a predetermined period is assumed (b11 in FIG. 5).

As described previously, when a command is relayed by the data-link layer 13, the ASPM controller 11 (uncompleted command transmission length determination module 112) acquires the transmission length thereof and, when the timeout occurs, determines whether or not the transmission length is greater than or equal to the threshold. Here, this time, a case where the transmission length of the command is greater than or equal to the threshold is assumed.

When the transmission length of the command is long, it is presumed that the ratio of the time spent on the restoration of the data-link layer 13 from the low-energy-consumption state ($L_1$) to the normal state ($L_0$) to the time spent on the command processing (b10 in FIG. 5) is small. That is, it is considered that the influence of the former time on the performance is small. Thus, in such a case, priority is given to the energy reduction, and the ASPM controller 11 causes the data-link layer 13 to transition to the low-energy-consumption state ($L_1$) (b12 in FIG. 5). Thereby, it is possible to reduce the energy consumption of the SSD 1.

It should be noted that when thereafter a processing result is output from the application layer 15 which has completed the processing (b13 in FIG. 5), the ASPM controller 11 restores the data-link layer 13 to the normal state ($L_0$) (b14 in FIG. 5). The processing result output from the application layer 15 is relayed to the host device 2 through the data-link layer which has been restored to the normal state ($L_0$) (b15 in FIG. 5).

FIG. 6 is a flowchart showing a procedure of control associated with the transition of the state of the data-link layer 13 to be executed by the SSD 1 of this embodiment.

Having detected that the period in which the date-link layer 13 is in the idle state exceeds a predetermined period (YES in block B1), the SSD 1 checks the transmission length of an uncompleted command being processed by the application layer 15 (block B2). When the transmission length of the command is greater than or equal to the threshold (YES in block B3), the SSD 1 causes the data-link layer 13 to transition from the normal state ($L_0$) to the low-energy-consumption state ($L_1$) (block B4).

On the other hand, when the transmission length of the command is less than the threshold (NO in block B3), the SSD 1 does not cause the data-link layer 13 to transition from the normal state ($L_0$) to the low-energy-consumption state ($L_1$), and maintains the data-link layer 13 in the normal state ($L_0$) (block B5).

As described above, the SSD 1 of this embodiment achieves an improvement in the control associated with the transition of the state of the data-link layer 13.

Third Embodiment

Next, a third embodiment will be described below.

FIG. 7 is a block diagram showing a configuration example of a storage device according to this embodiment. As in the aforementioned first embodiment, here, it is also assumed that the storage device is realized as an SSD 1 utilized as, for example, a main storage of the host device 2. Thus, regarding components, and the like identical to the aforementioned first embodiment, identical reference symbols are used, and descriptions of them are omitted.

As shown in FIG. 7, in an SSD 1 of this embodiment, an ASPM controller 11 of a host interface 10 includes a restoration timing determination module 113 (in place of the uncompleted command presence/absence determination module 111 of the first embodiment). The restoration timing determination module 113 is a module which detects, for example, when a read command is issued from the host device 2, that preparation of read data has been completed in the NAND memory 50 (that output preparation of data carried out by the NAND controller 40 has been completed) or detects that storing of data read from the NAND memory 50 in the data buffer 30 has been completed. It should be noted that, as in the aforementioned first embodiment, the restoration timing determination module 113 may be provided not in the ASPM controller 11, but in, for example, a host interface 10 separately from the ASPM controller 11.

Figure 8:
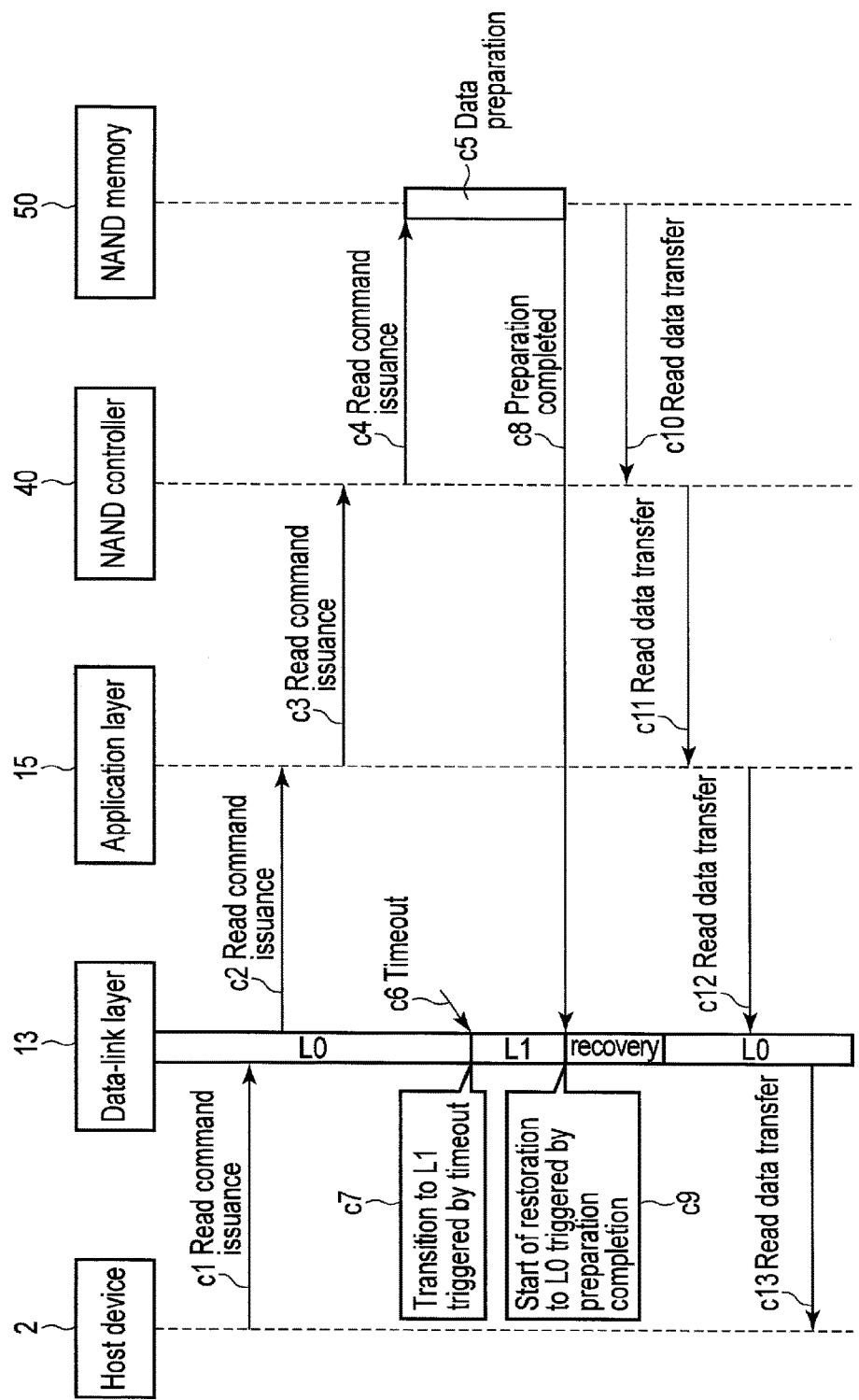
FIG. 8 is a sequence chart for explaining the transition of the state of a communication path between the storage device of the third embodiment and host device.

An outline of the control associated with the transition of the state of the data-link layer 13 to be executed by the ASPM controller 11 provided with the restoration timing determination module 113 will be described below with reference to FIG. 8. FIG. 8 is a sequence chart for explaining the transition of the state of the data-link layer 13 in the SSD 1 of this embodiment. It should be noted that here a case where the restoration timing determination module 113 determines whether or not preparation of read data is completed in the NAND memory 50 is assumed. Further, as in the aforementioned first embodiment, in FIG. 8 too, notations of the physical layer 12 and the transaction layer 14 are omitted.

When a read command is issued by the host device 2 (c1 in FIG. 8), the read command is relayed to the application layer 15 through the data-link layer 13 (c2 in FIG. 8). Then, the application layer 15 executes processing corresponding to the read command.

More specifically, the application layer 15 issues a read command to the NAND controller 40 (c3 in FIG. 8). Upon receipt of this read command, the NAND controller 40 also issues a read command to the NAND memory 50 (c4 in FIG. 8), and the NAND memory 50 prepares data (read data) corresponding to the read command (c5 in FIG. 8).

Here, a case (timeout occurrence) where the time elapsed from the time when the data-link layer 13 which has completed the relay of the read command has been brought into the idle state exceeds a predetermined period is assumed (c6 in FIG. 8). When a timeout occurs, the ASPM controller 11 causes the data-link layer 13 to transition to the low-energy-consumption state ($L_1$) (c7 in FIG. 8). Thereafter, when the NAND memory 50 completes the preparation of the read data (c8 in FIG. 8), the ASPM controller 11 (restoration timing determination module 113) detects the fact. As the detection method, for example, various methods such as notification to the host interface 10 carried out by the NAND controller 40, and the like can be employed.

Taking this opportunity of the completion of the preparation of the read data carried out by the NAND memory 50, the ASPM controller 11 starts reastoration of the data-link layer 13 from the low-energy-consumption state ($L_1$) to the normal state ($L_0$) (c9 in FIG. 8). On the other hand, the NAND memory 50 which has completed the preparation of the read data transmits the read data to the NAND controller 40 (c10 in FIG. 8), and the NAND controller 40 also transmits the read data to the application layer 15 (ell in FIG. 8). Then, the application layer 15 outputs the read data as a processing result (c12 in FIG. 8).

At this time, the data-link layer 13 has already been restored to the normal state ($L_0$), and hence the processing result output from the application layer 15 is relayed to the host device 2 through the data-link layer which has been restored to the normal state ($L_0$) (c13 in FIG. 8). As in the aforementioned case, it is not necessary to restore the data-link layer 13 from the low-energy-consumption state ($L_1$) to the normal state ($L_0$), and hence it is possible to realize speed-enhancement with respect to the relay carried out by the data-link layer 13 as compared with the conventional case where the data-link layer 13 is restored from the low-energy-consumption state ($L_1$) to the normal state ($L_0$).

FIG. 9 is a flowchart showing a procedure of control associated with the transition of the state of the data-link layer 13 to be executed by the SSD 1 of this embodiment.

Having detected that the period in which the data-link layer 13 is in the idle state exceeds the predetermined period after the relay of the read command (YES in block C1), the SSD 1 causes the data-link layer 13 to transition from the normal state ($L_0$) to the low-energy-consumption state ($L_1$) (block C2). Having further detected that the NAND memory 50 has completed the preparation of the read data (YES in block C3), the SSD 1 starts, at that timing, restoration of the data-link layer 13 from the low-energy-consumption state ($L_1$) to the normal state ($L_0$) (block C4).

As described above, the SSD 1 of this embodiment achieves an improvement in the control associated with the transition of the state of the data-link layer 13.

It should be noted that, as described previously, the restoration timing determination module 113 may detect not only that the NAND memory 50 has completed the preparation of the read data, but also that storing of the data read from the NAND memory 50 in the data buffer 30 has been completed. In this case, when the data-link layer 13 has already made the transition to the low-energy-consumption state ($L_1$) after the relay of the read command, restoration of the data-link layer 13 from the low-energy-consumption state ($L_1$) to the normal state ($L_0$) may be started taking the opportunity of the fact that storing of the data read from the NAND memory 50 in the data buffer 30 has been completed.

Besides, for example, taking the opportunity of not only the fact associated with the read command, but also the fact that the time elapsed from the time when the data-link layer 13 has received the command reaches a predetermined period, restoration of the data-link layer 13 from the low-energy-consumption state ($L_1$) to the normal state ($L_0$) may be started. In this case, furthermore, for example, the period to the start of restoration may be adaptively determined according to the transmission length of the command to be acquired at the time of the relay of the command carried out by the data-link layer 13.

As described above, as the opportunity for restoring the data-link layer 13 from the low-energy-consumption state ($L_1$) to the normal state ($L_0$) beforehand in preparation for a relay of a processing result in the near future, various timing can be employed.

Each of the various functions described in the embodiments may be realized by a processing circuit. In the examples of the processing circuits, a programmed processor such as a central processing unit (CPU) is included. This processor executes a program stored in a memory to thereby execute each of described functions. This processor may be a microprocessor including an electric circuit. The examples of the processing circuits include a digital signal processor (DSP), application-specific integrated circuit (ASIC), microcontroller, controller, and other electric circuit components.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a nonvolatile first memory;
   a volatile second memory; and
   a processor which communicates with a host device connected to the storage device via a communication path, wherein:
   the processor executes first processing, second processing and third processing;
   the first processing comprises processing for access to the first memory through the second memory;
   the second processing comprises processing for relaying a command to request access to the first memory issued by the host device, and an execution result of the first processing corresponding to the command, between the host device and the first processing;
   the third processing comprises processing for causing the second processing to transition from a first state to a second state of lower energy consumption than the first state, when a first period in which the second processing is in an idle state exceeds a second period; and
   the third processing further comprises processing for maintaining the first state of the second processing under a first condition, when the first period exceeds the second period.

2. The storage device of claim 1, wherein the third processing further comprises processing for causing the second processing to transition to the first state under a second condition, when the second processing is in the second state and when the second processing is in the idle state.

3. The storage device of claim 1, wherein the first condition comprises a condition that an uncompleted command being processed by the first processing is present.

4. The storage device of claim 1, wherein the first condition comprises a condition that a transmission length of an uncompleted command being processed by the first processing is less than a first value.

5. The storage device of claim 1, wherein the third processing further comprises processing for causing the second processing to transition to the first state, when the second processing is in the second state while the first processing corresponding to the command to request read of data from the first memory is being executed, and when the first memory completes preparation of the data which is an object to be read.

6. The storage device of claim 1, wherein the third processing further comprises processing for causing the second processing to transition Lo the first state, when the second processing is in the second state while the first processing corresponding to the command to request read of data from the first memory is being executed, and when storing of data which is an object to be read and which is stored in the first memory in the second memory is completed.

7. The storage device of claim 1, wherein the third processing further comprises processing for causing the second processing to transition to the first state, when the second processing is in the second state while the first processing corresponding to the command to request access to the first memory is being executed, and when a third period elapsed from a time when an uncompleted command being processed by the first processing is relayed exceeds a fourth period longer than the second period.

8. The storage device of claim 7, wherein the fourth period is determined based on the transmission length of the uncompleted command being processed by the first processing.

9. A storage device comprising:
a memory; and
a controller which controls a communication path used for communicating with a host device, wherein:
the controller causes the communication path to transition from a first state to a second state of lower energy consumption than the first state, when a first period exceeds a second period, the first period being a period in which communication for receiving a command issued by the host device to request access to the memory, and communication for returning an execution result of the command to the host device are in a non-execution state, and
the controller maintains the first state of the communication path under a first condition, when the first period exceeds the second period.

10. A control method for a storage device comprising a nonvolatile first memory and a volatile second memory, the method comprising:
executing first processing for access to the first memory through the intervention of the second memory;
executing second processing for relaying a command to request access to the first memory issued by a host device connected to the storage device via a communication path, and an execution result of the first processing corresponding to the command, between the host device and the first processing; and
executing third processing for causing the second processing to transition from a first state to a second state of lower energy consumption than the first state, when a first period in which the second processing is in an idle state exceeds a second period,
wherein the third processing comprises processing for maintaining the first state of the second processing under a first condition, when the first period exceeds the second period.

11. The control method of claim 10, wherein the third processing further comprises processing for causing the second processing to transition to the first state, when the communication path is in the second state and the second processing is in the idle state, under a second condition.

12. The control method of claim 10, wherein the first condition comprises a condition that an uncompleted command being processed by the first processing is present.

13. The control method of claim 10, wherein the first condition comprises a condition that a transmission length of an uncompleted command being processed by the first processing is less than a first value.

14. The control method of claim 10, wherein the third processing further comprises processing for causing the second processing to transition to the first state, when the second processing is in the second state while the first processing corresponding to the command to request read of data from the first memory is being executed, and when the first memory completes preparation of data which is an object to be read.

15. The control method of claim 10, wherein the third processing further comprises processing for causing the second processing to transition to the first state, when the second processing is in the second state while the first processing corresponding to the command to request read of data from the first memory is being executed, and when storing of data which is an object to be read and which is stored in the first memory in the second memory is completed.

16. The control method of claim 10, wherein the third processing further comprises processing for causing the second processing to transition to the first state, when the second processing is in the second state while the first processing corresponding to the command to request access to the first memory is being executed, and when a third period elapsed from a time when an uncompleted command being processed by the first processing is relayed exceeds a fourth period longer than the second period.

17. The control method of claim 16, wherein the fourth period is determined based on the transmission length of the uncompleted command being processed by the first processing.

* * * * *